(12) United States Patent
Farrell et al.

(10) Patent No.: US 6,269,475 B1
(45) Date of Patent: *Jul. 31, 2001

(54) INTERFACE FOR OBJECT ORIENTED PROGRAMMING LANGUAGE

(75) Inventors: Edward J. Farrell, Waltham, MA (US); Neeraj Sangal, Hollis, NH (US)

(73) Assignee: Webgain, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,909

(22) Filed: Jun. 2, 1998

Related U.S. Application Data

(60) Provisional application No. 60/048,235, filed on Jun. 2, 1997.

(51) Int. Cl.⁷ .................................................... G06F 9/45
(52) U.S. Cl. ........................................ 717/2; 717/1
(58) Field of Search ................................... 395/702, 701, 395/710; 717/2, 1; 707/103; 709/205

(56) References Cited

U.S. PATENT DOCUMENTS

| | | | | |
|---|---|---|---|---|
| 5,325,533 | * | 6/1994 | McInerney et al. | 395/701 |
| 5,345,550 | * | 9/1994 | Bloomfield | 395/353 |
| 5,446,842 | * | 8/1995 | Schaeffer et al. | 709/205 |
| 5,495,567 | * | 2/1996 | Iizawa et al. | 345/334 |
| 5,519,866 | * | 5/1996 | Lawrence et al. | 395/710 |
| 5,734,837 | * | 3/1998 | Flores et al. | 705/7 |
| 5,917,730 | * | 6/1999 | Rittie et al. | 703/6 |
| 5,956,479 | * | 9/1999 | McInerney et al. | 714/38 |
| 6,072,490 | * | 6/2000 | Bates et al. | 345/347 |
| 6,088,028 | * | 7/2000 | Gipalo | 345/333 |
| 6,104,393 | * | 8/2000 | Santos-Gomez | 345/336 |
| 6,134,559 | * | 10/2000 | Brumme et al. | 707/103 |

* cited by examiner

*Primary Examiner*—Kakali Chaki
*Assistant Examiner*—Chameli Chaudhuri Das
(74) *Attorney, Agent, or Firm*—Bromberg & Sunstein LLP

(57) ABSTRACT

An object oriented program editor operative on a text source in a language having syntax properties having a lexical analyzer, a parser, a codeblock generator and a graphical user interface. The lexical analyzer identifies language tokens in the text source. The parser which is coupled to the lexical analyzer associates syntax properties with the tokens. The codeblock generator which is coupled to the parser, groups tokens into a tree of codeblocks. The graphical user interface receives and implements user modifications of the codeblocks in a manner consistent with the programming language. A system for generating source code in a program language with respect to an object model having a plurality of classes and relations among such classes having a class selection interface, an action selection interface and a source code generator. The class selection interface is used for user selection of a chosen class. The action selection interface is used for user selection of (i) an entity associated with the model, the entity being one of a class and an instance of a class, on which to perform an action and (ii) user selection of an action to be performed on the entity wherein the action to be performed is selectable from a set of possible actions, the set being determined by the entity selected. The source code generator is used for generating source code in the program language to cause the action to be performed on the entity, and associating such code with the chosen class.

25 Claims, 20 Drawing Sheets

```
//This is a method in the selected class
void method 1()  ──191
{
...
//Calling method2
WrapObject wrapVar3=new WrapObject();  ──198
varType2 var2 = var0.method2(var1, wrapVar3);  ──194
varType3 var3 = (varType3)wrapVar3.getObject();  ──199
...

//Calling method3
var1.method3(var2,var3);  ──195
}

//This is a method in class varType0
varType2 method2(varType1 var1, WrapObject wrapVar3)  ──192
{
...

varType2 var2;
varType3 var3;

...
//returning - set wrapper
wrapVar3.setObject(var3);  ──196
return(var2);  ──197
}

//This is a method in class varType1
void method3(varType2 var2, varType3 var3)  ──193
{
...
}

//Class to define wrapper class
class WrapObject
{
private Object obj:

public void setObject(Object obj)
{
as.obj = obj;
} public Object getObject()
{
return(obj);
}
}
```

FIG. 19

INTERFACE FOR OBJECT ORIENTED PROGRAMMING LANGUAGE

This application claims priority from provisional application serial No. 60/048,235, filed Jun. 2, 1997, entitled "Interface for Object Oriented Programming Language" which is incorporated herein, in its entirety, by reference.

TECHNICAL FIELD

Object oriented program development environments using a graphical user interface to assist in program development.

BACKGROUND ART

Application programs, such as the visual development tools produced by Microsoft Corporation, Visual C++, Visual Basic, and Visual J++ provide a graphical user interface to assist in the development of programs in various object oriented programming languages. Other vendors such as Symantec corporation provide applications for similar development assistance. These programming solutions allow for editing and adding source code in a text editor along with creating a graphic representation of the source code. The text editor in these development tools is independent of the graphic representation. The development tool does not immediately reflect the changes in the graphic representation when new code is added, an intermediary step must occur, such as, compilation of the code, or reparsing of the entire source code to rebuild the graphic representation.

Additionally, in these development tools, source code may be generated by the development tool, providing structural code, which must be added to by a user to furnish usable code. The development tool kits create user interface code and skeletal code to which a user must add, so that the interface code, once compiled, may perform some function desired by the user. For example, in Visual C++ a user may wish to create a dialog box with a button to start a user created program and a button to stop the program. The user can choose to create a dialog box with a button representing start and a button representing stop which the development tool will generate. However, Visual C++ will not assist in generating code for the user created program. A user must develop the functions and classes for implementing this software without assistance from the development tool.

For additional information on graphical representation of code and code generators please see, *Adaptive Object-Oriented Software The Demeter Method with propagation patterns* by Karl J. Lieberherr, PWS Publishing Company 1996. ISBN 0-534-94602-X, Object Oriented Modeling and Design by James Rumbaugh et al., Prentice Hall 1991. ISBN 0-13-629841-9, *Taming C++ Pattern Classes and Persistence for Large Projects* by Jiri Soukup, Addison Wesley PublishingCompany 1994. ISBN 0-201-52826-6, *The Gen-Voca Model of Software-System Generators*, by Don Batory, Vivek Singhal, Jeff Thomas, Sankar Dasari, Bart Geraci, and Marty Sirkin, IEEE Software, September 1994, A Software *System Generator for DataStructures*, Ph.D. Dissertation by Martin J. Sirkin Department of Computer Science and Engineering, University of Washington, March 1994, *Scalable Software Libraries*, Don Batory, Vivek Singhal, Jeff Thomas, and Marty Sirkin, Proceedings of the ACM SIGSOFT '93 Conference (Los Angeles), December 1993. All of which are incorporporated herein by reference in their entirety.

SUMMARY OF THE INVENTION

The invention provides in a preferred embodiment, an object oriented program editor operative on a text source in a language having syntax properties. The editor includes a lexical analyzer for identifying language tokens in the text source, a parser coupled to the lexical analyzer for associating syntax properties with the tokens, a codeblock generator coupled to the parser, for grouping tokens into a tree of codeblocks, and a graphical user interface for receiving and implementing user modifications of the codeblocks in a manner consistent with the programming language.

In a further and related embodiment, the graphical user interface includes a display of an object model for the text source and causes the object model to be updated when a user modification is implemented. In another embodiment, the graphical user interface enables user modification of the object model and causes the text source to be correspondingly updated in a manner consistent with the object model and the programming language. In yet a further embodiment, the graphical user interface provides an arrangement for graphical selection of a codeblock and a menu showing syntactically correct options that are available for manipulation of the selected codeblock. In a further related embodiment, the graphical user interface provides a menu showing all syntactically correct options that are available for manipulation of the selected codeblock. In accordance with another embodiment of the invention, the codeblock is a variable. In accordance with yet another embodiment the codeblock is a method.

System embodiments for generating source code in a program language with respect to an object model having a plurality of classes and relations among such classes are also provided. In accordance with one embodiment, a system includes a class selection interface, an action selection interface, and a source code generator. The class selection interface is used for user selection of a chosen class. The action selection interface provides for user selection of an entity associated with the model and an action to be performed on the entity. The entity is either a class or an instance of a class. The action is selected from a set of possible actions and it is determined by the entity that is selected. The source code generator is used for generating source code in the program language and the generated source code causes the action to be performed on the entity. The source code generator also associates such code with the chosen class. In a further embodiment, the entity is a class. In yet another embodiment, the entity is an instance of a class, and the instance is an object.

In another embodiment, a parameter selection interface is added to the system for user selection of input parameters, wherein the action selection interface provides a list of input parameters from which the entity may be selected. In another embodiment the entity is an instance of a class generated in a previous operation of the action selection interface. In yet a further embodiment, the action selection interface and the source code generator are configured to permit selection of a plurality of actions and a plurality of entities. In another embodiment, a graphical user interface is added to the system that enables user selection of the chosen class and the action. In another embodiment, the source code is generated in such a way as to take into account restrictions inherent in the object model. In further related embodiments, the action selection interface includes an action properties interface for specifying properties of the action selected, wherein choices presented by the properties interface are customized according to the action selected.

A further group of related embodiments is described below. In an embodiment, the action selection interface further permits user selection of a condition for performance of a set of actions selected by the action selection interface, the set including at least one action. In another embodiment the action selection interface includes an action properties interface for specifying properties of the action selected, wherein choices presented by the properties interface are customized according to the action selected. In a further embodiment, the object has a creation point in the source code generated by the source code generator and it is declared. The object also has an action point in the source code generated by the source code generator wherein the object is acted upon by the action to be performed on it. An object transporter is added to the system for creating method parameters in the source code sufficient to pass the object from the creation point to the action point. In yet another embodiment, the object transporter identifies all usage points in the source code generated by the source code generator wherein the object is used and creates method parameters in the source code sufficient to pass the object to all such usage points.

Another group of further related embodiments of the system for displaying an object model that is the subject of a computer program, where the object model has a plurality of classes and relations among such classes is described below. The system has a common object model storage arrangement for storing the object model and a view definer, coupled to the common object model storage arrangement, for defining a plurality of views of the object model, each view having its own display properties and set of classes displayed therein so that when the object model stored in the common object model storage arrangement is modified, all views defined by the view definer are correspondingly modified. In another embodiment, the view definer includes a graphical user interface for at least one of moving and copying a set of classes, the set having at least one member, from one of the views to another of the views. In yet a further embodiment, the view definer permits each class to have distinct display properties in each view.

BRIEF DESCRIPTION OF THE DRAWINGS

The invention will be more readily understood by reference to the following detailed description of specific embodiments taken with reference to the accompanying drawings in which:

FIG. 3 shows two unrelated related classes in the object model and source code corresponding to one of the classes;

FIG. 4 shows text being added to the source code in the editor window;

FIG. 5 shows operation of the editor on the added text of FIG. 4 in showing the creation of a codeblock in the editor window and a corresponding element in the object model displayed in the diagram window;

FIG. 6 shows the selection of the same codeblock in the editor window and a context-sensitive menu corresponding to the codeblock, the menu evidencing a change to the variable from private to protected access;

FIG. 7 shows the result in both windows of the change referred to in FIG. 6;

FIG. 8 shows selection of the same variable and context-sensitive window in the diagram window as shown in connection with FIG. 6, the menu evidencing a change to the variable from protected to public access;

FIG. 9 shows the result in both windows of the change referred to in FIG. 8;

FIG. 13 shows in the diagram window user selection of a chosen class, namely LicenseManager, and a menu presenting user choices for operation on the class, the selected operation being Generated Method, which invokes the code generator of FIG. 12;

FIG. 14 shows a portion of an action selection interface, the generated methods dialog screen, in accordance with a preferred embodiment of the invention here permitting selection of a parameter (myApp), an action (Find), and an entity on which the action is performed (this.applications) as well as displaying property names and user selectable values of such property names;

FIG. 15 shows another portion of the action selection interface, Object Tracker, in which an object (here appl.licenseBlocks) may be selected as well as an action (here Add) to be performed on the object;

FIG. 16 shows, in the generated methods dialog screen, the result of the selection of FIG. 15;

FIG. 17 shows the effect of selecting the double arrow button on the lower right hand corner of the screen of FIG. 16, namely the additional display in the right hand portion of the screen of an editor window showing source code generated as a result of the operation of the action selection interface, wherein the highlighted codeblock corresponds to the similarly highlighted object-action combination in the actions window; and FIG. 18 is similar to FIG. 17 wherein a different highlighted codeblock corresponds to another highlighted object-action combination in the actions window.

FIG. 19 shows source code which is generated for the process of variable transportation.

DETAILED DESCRIPTION OF SPECIFIC EMBODIMENTS

In accordance with a preferred embodiment of the invention, a method and apparatus for an object oriented textual editor operative on a text source in a language having syntax properties is herein described. As used in this description and the accompanying claims, the term "codeblock" means a sequence of text characters representing an instance of a syntactic element of a programming language. As used in this description and the accompanying claims, the term "syntactic element" is a unit of source code. For example, in typical object oriented programming languages, a syntactic element may be of any of the following types:

Class
Method
Variable
Annotation (Comment)
Generated Code
File
File Header
User (including anything not previously listed, including white space)

Any given source code listing is therefore a tree of instances of syntactic elements, and therefore a tree of codeblocks. As used in this description and the accompanying claims, the term "type" refers to the standard types in computer programming, such as, but not limited to, integer, class, double, character and also to user defined types. Within this specification and the following claims the word "graphic" shall refer to, but is not limited by, an image which is displayed on a computer monitor or other displaying medium. A graphic includes images of source code or components of source code in the form of a tree structure, a block structure, a unified modeling diagram, a class tree or any other representation of source code. Within this specification and the following claims the word "object" shall refer to a recognized element in a programming language such as a variable or a method or a class unless it is indicated otherwise. In preferred embodiments, the textual editor is formatted as source code for compilation by a software compiler to produce an executable code file. The executable code file then may be run to display a graphical image on a display device.

Figure 1:
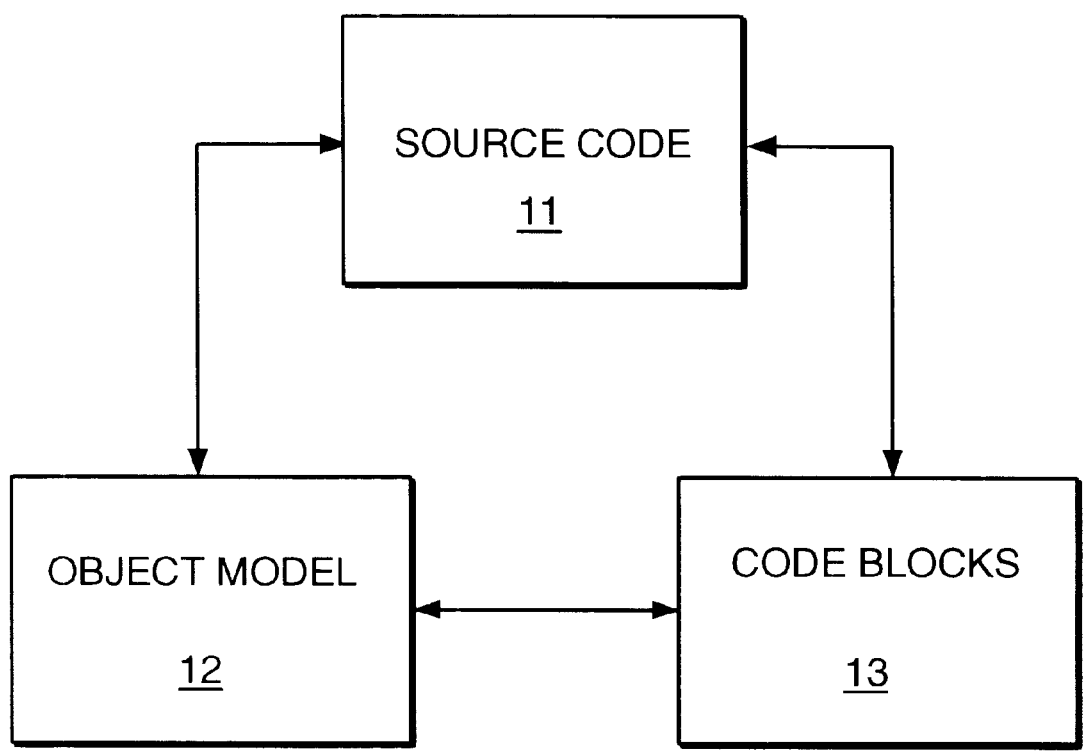
FIG. 1 shows a block diagram of the relationships between the source code, the object model and the codeblocks in accordance with a preferred embodiment of the present invention.

FIG. 1 shows a block diagram of the relationships between source code 11, an object model 12 and codeblocks 13 in accordance with a preferred embodiment of the present invention. Code blocks 13, object model 12 and source code 11 of FIG. 1, represent generic representations of actual codeblocks, object models and source code and will be referred to throughout this disclosure with reference to actual examples of source code, object models and codeblocks.

From source code 11, an object model 12 of source code 11 is created. Object model 12 contains, but is not limited by, the following information, the names of the classes, the variables in the classes, the methods in the classes and the relationship between the classes. Codeblock 13 is formed from object model 12. Codeblock 13 contains a placeholder and pointer to source code 11 indicating the position in source code 11 that codeblock 13 is from. Codeblock 13 may contain one or more objects. Codeblock 13 also holds type of codeblock 13 and has a pointer to object model 12. Information may be passed from source code 11 to the object mode and vice versa. As changes are made to source code 11 object model 12 is updated and in a likewise manner changes to object model 12 are reflected in source code 11. Similarly codeblocks 13 are linked to source code 11 and to object model 12. Making changes to source code 11 causes object model 12 and codeblocks 13 to be updated changes to object model 12 or codeblocks 13 are updated in the source code 11.

Figure 2:
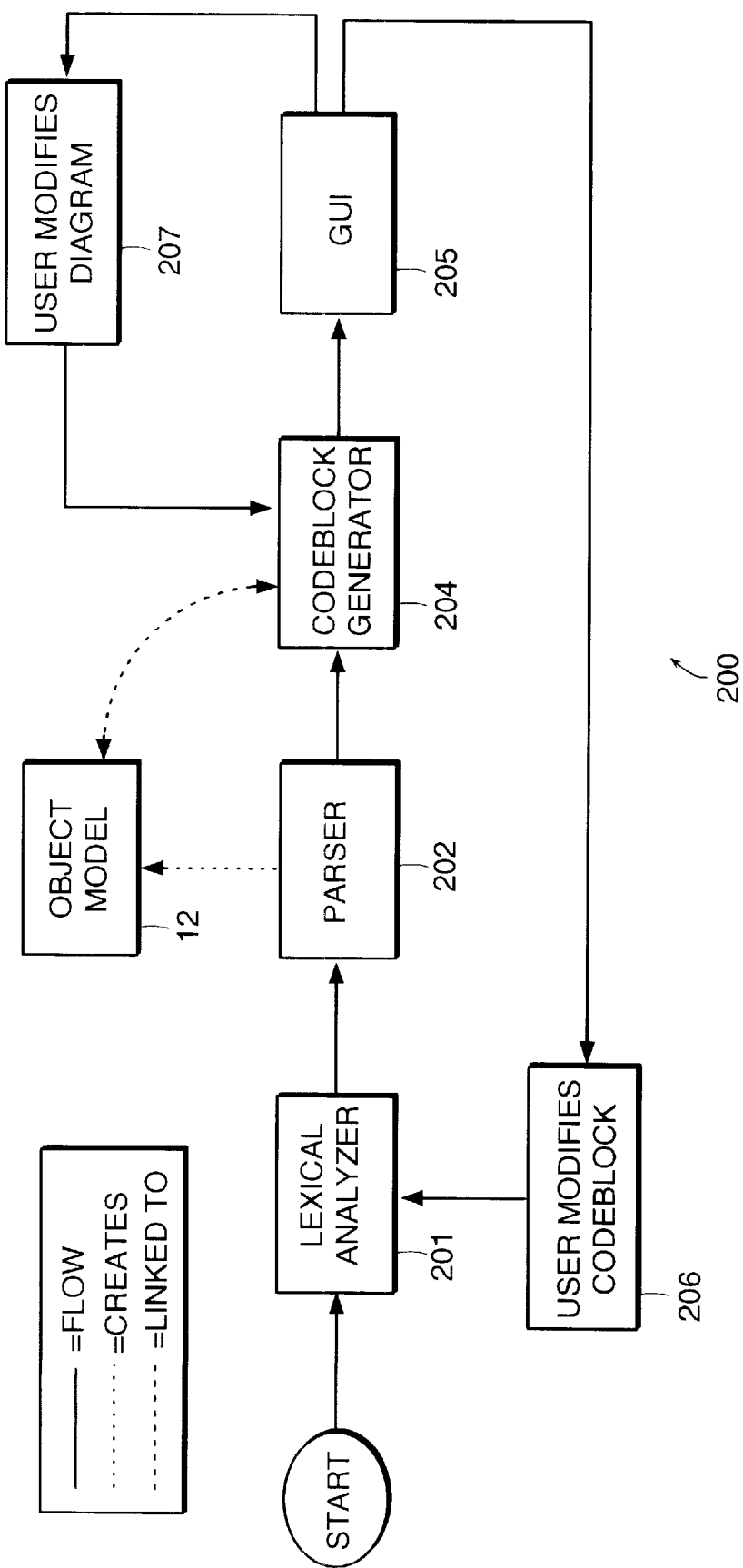
FIG. 2 shows a logical flow diagram of a text editor in accordance with a preferred embodiment of the present invention.

FIG. 2 shows a logical flow diagram of a text editor 200 in accordance with a preferred embodiment of the present invention. A lexical analyzer 201 parses the input text (not shown) and marks the location of all language syntax tokens (not shown). The input to lexical analyzer 201 in one embodiment is ascii text. Lexical analyzer 201 denotes the starting and ending points of each token of the syntax. In addition, the syntax tokens are placed into nodes in a parse tree. The parse tree consists of the tokens and is an internal representation of the inherent structure of the program. In one embodiment lexical analyzer 201 may be composed of the programs known as Lex and Yacc. In a preferred embodiment lexical analyzer 201 understands the syntax of the JAVA computer language and recognizes syntax tokens.

From lexical analyzer 201, the parse tree is passed to parser 202. Parser 202 takes the tree and forms object model 12 from the tokens. Parser 202 groups together the tokens into recognized objects such as a class, a variable, a method declarations, expressions, and statements. Within object model 12, the grouped tokens which denote objects are stored as data structures. The starting and ending code positions of each object within the input text are also stored within the data structure for the object. For example, a method which would be an object contains the token for indicating a start point for the method and a token indicating the length of the method.

A codeblock generator 204 builds appropriate codeblock 13 from each object within object model 12 based on the type of object. Codeblock generator 204 associates the data structure of object with its codeblock 13. When a particular object or codeblock 13 is edited in this system, only that code which is represented by object or codeblock 13 needs to be passed to lexical analyzer 201, parsed and have a codeblock 13 generated for it. The code does not need to be reloaded, nor does entire source code 11 need to be regenerated or reparsed.

A graphic user interface (GUI) 205 allows a user to change either to edit or add to codeblocks 13 within editor 200 as indicated by block 206 or by making changes and edits to the graphic representation of codeblocks 13 as indicated by block 207.

In a preferred embodiment a user may select one of codeblocks 13 in textual editor 200. Two outcomes are possible. If codeblock 13 is a non-editable codeblock entire codeblock 13 will become highlighted. The user will be presented with a menu of options, particular to the type of codeblock that is selected. If codeblock 13 is an editable codeblock, the user will be allowed to type directly within editor 200. Once typing has finished editor 200 will perform a lexical analysis and parse the text that has been added by the user. This allows codeblock 13 and the object within it to be edited by a user without the need to regenerate or reparse any information other than what has been changed. Any new objects found will result in object model 12 being updated and new codeblocks 13 being generated. As the user edits source code 11 of the object the system restricts the content of lexical analyzing and parsing to the code of the associated object. For example, if the changes are inside of a class then the buffer within the class is parsed and checked for syntax correctness.

In a preferred embodiment, the user may modify the graphic representation of codeblocks 13 in a display window. The user may select a location in which to add a codeblock 13 to the diagram or the user may remove an existing codeblock in the display window. When the user modifies object model 12 outside of textual editor 200 in such a way, codeblock generator 204 is activated. The codeblock is updated based on new object model information. The new codeblock is then displayed in an editor window. In one embodiment, the system can also generate a graphic direct from actual JAVA source code and may display both the graphic and source code 11 text side by side on a display medium. The system can generate the structure of an application in the form of a graphic in the display window based on object model 12 and can reflect changes to the design by providing real-time code updates. The code generation feature provides immediate feedback of all user entered code through the graphic user interface.

FIGS. 3 through 9 are screen shots of a preferred embodiment showing operation of text editor 200 of FIG. 2 in turning text into a codeblock and an element in object model 12. In the following figures a user is adding code to an editable codeblock.

Figure 3:
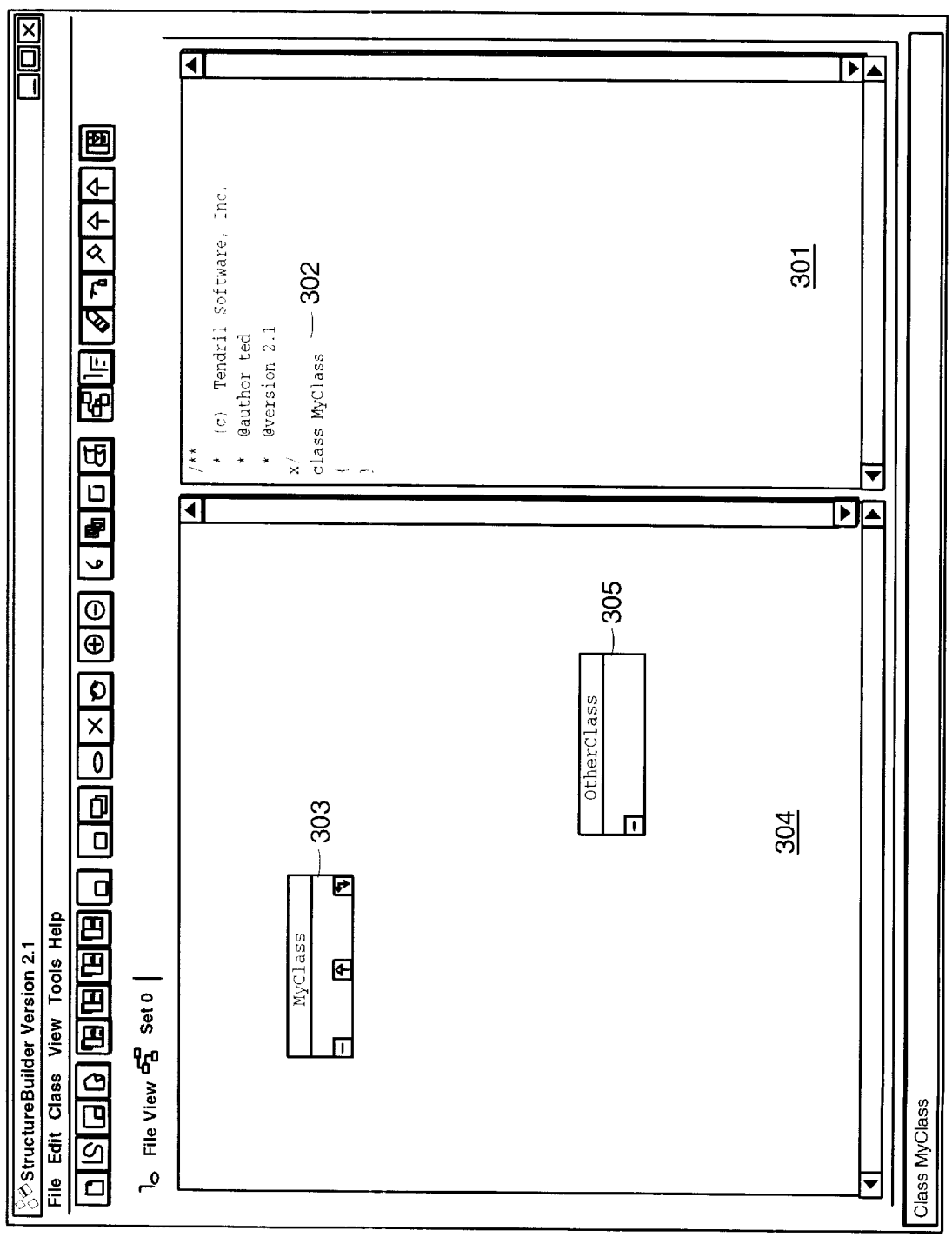
FIGS. 3 through 9 are screen shots showing operation of the text editor of FIG. 2 in turning text into a codeblock and an element in the object model.

FIG. 3 shows two unrelated related classes in object model 12 and source code 11 corresponding to one of the classes. On the right side of the image, a user has typed in an editor window 301 of text editor 200 and a new class has been defined by a user called MyClass 302. On the left side of the image, a graphic representation of class MyClass 303 is displayed in display window 304 in response to the user's input. The user has also created in display window 304 a second class called OtherClass as represented by a box 305 with the name OtherClass disposed within the box.

Figure 4:
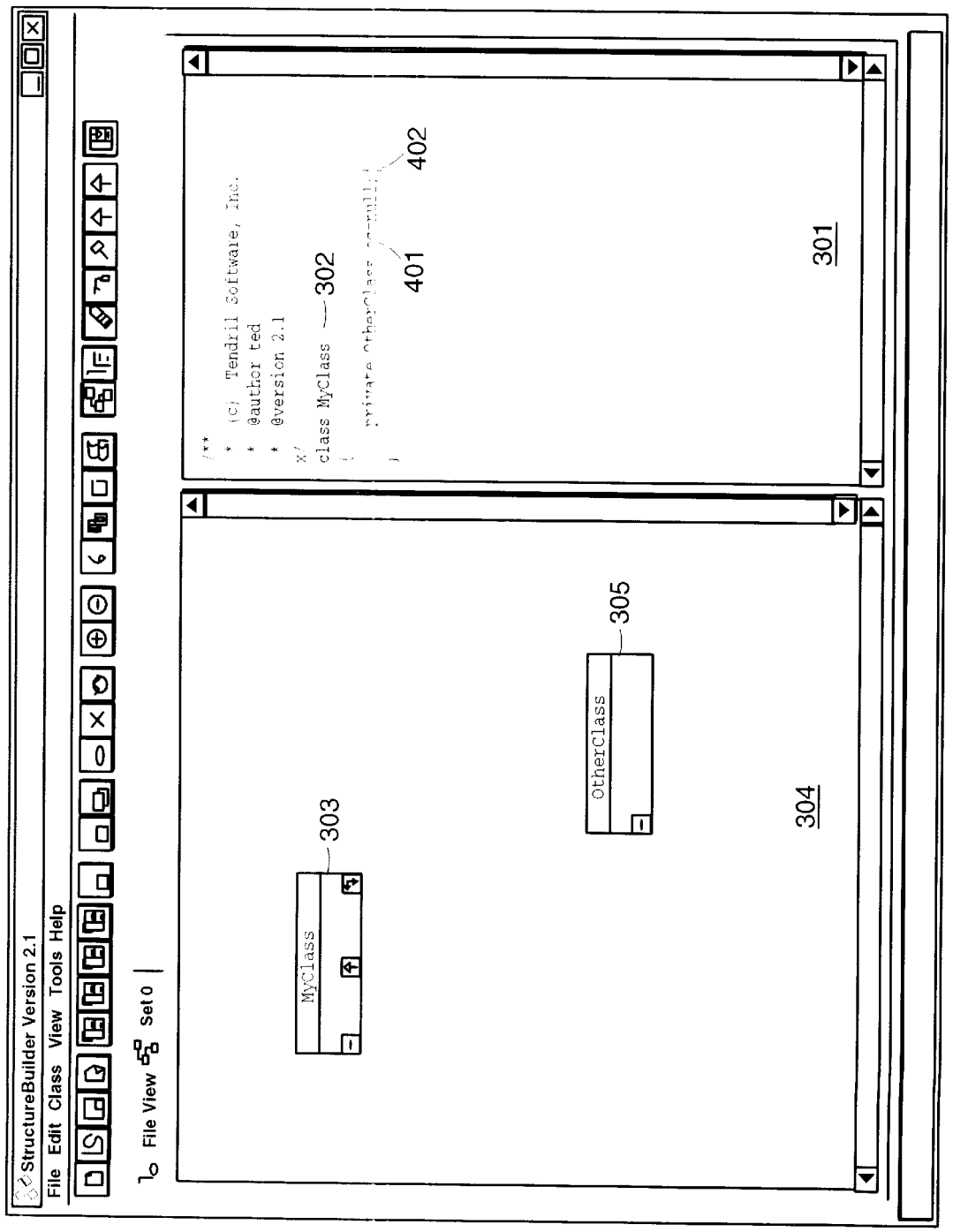

FIG. 4 shows text being added to source code 11 in editor window 301. The user has added text to the Class MyClass defining a variable oc 401 which is located within the class called OtherClass with oc being equal to null. In FIG. 4 of this example of the preferred embodiment, the user has not completed his editing as indicated by vertical line 402.

Figure 5:
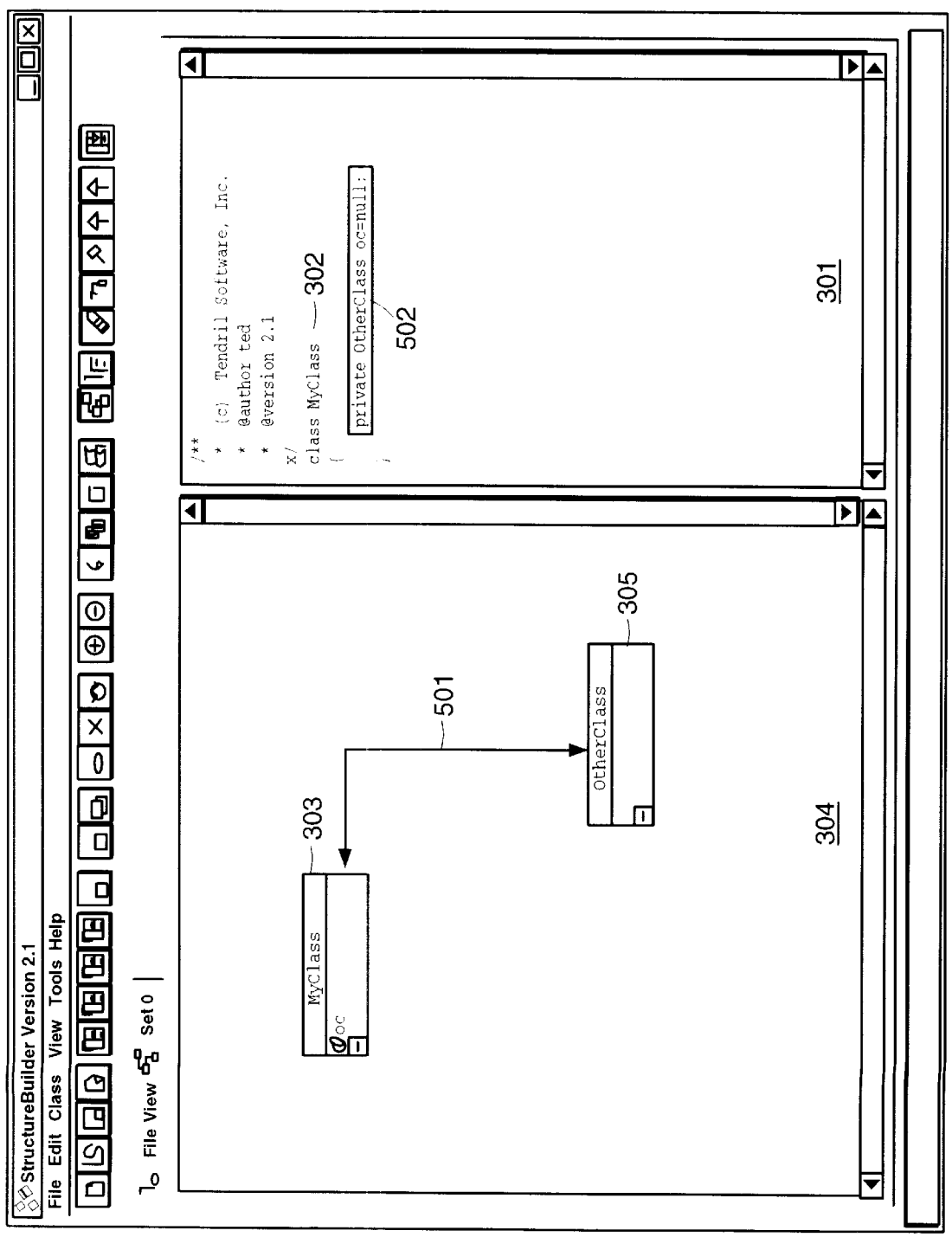

FIG. 5 shows operation of editor 200 on the added text of FIG. 4 in showing the creation of a codeblock 13 in editor window 301 and a corresponding element in object model 12 displayed in diagram window 304. Lexical analyzer 201 has parsed the added text line "private OtherClass oc=null;" and indicated that private is a syntax token. Parser 202 recognizes that the word following private is the name of a class, and parser 202 creates an object within object model 12 indicating that OtherClass is the location of variable oc 401. Parser 202 denotes that oc 401 is an object of the type variable that is within the class OtherClass and is being declared within the class MyClass. This declaration is represented graphically on the left side of the screen shot in display window 304 by oc 401 being located within box marked MyClass 303. Parser 202 also recognizes that oc 401 is a variable from class OtherClass 305 and this is indicated in display window 304 by a line 501 connecting MyClass 303 to OtherClass 305. Codeblock generator 204 has indicated that highlighted text 502 in editor window 301 constitutes a codeblock 13 of the type variable.

Figure 6:
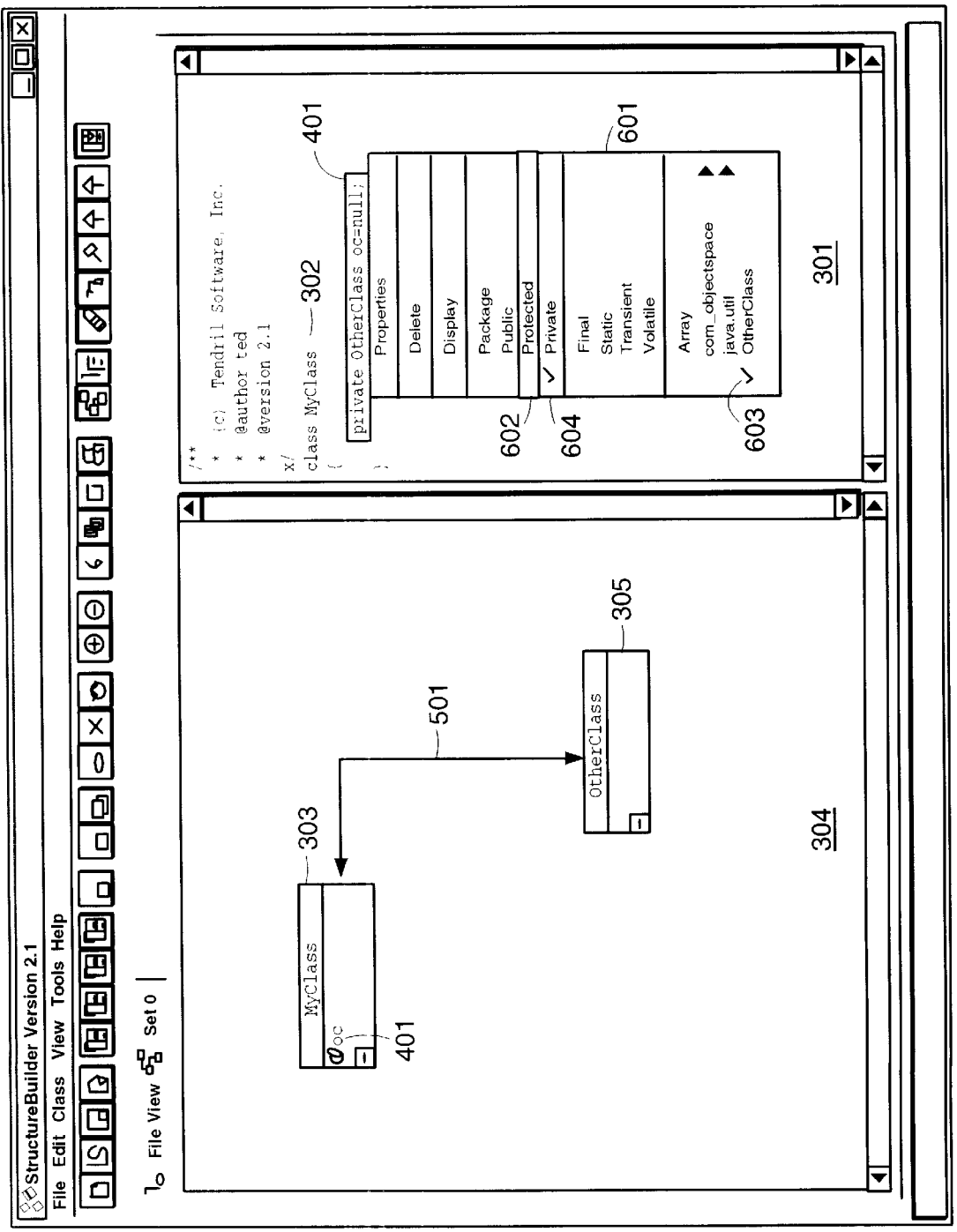

FIG. 6 shows the selection of same codeblock 13 in editor window 301 and a context-sensitive menu 601 corresponding to codeblock 13, the menu evidencing a change to the variable from private to protected access. In response to the creation of codeblock 13, context sensitive menu 601 provides a selection list of possible changes to be performed on the codeblock. In this case, codeblock 13 is of the type variable. In FIG. 6 the user has selected protected 602 to make the codeblock a protected type variable. Note that the selection menu contains some information on the data structure of the codeblock. The selection interface indicates with a check mark 603 that the selected object is part of OtherClass and that the object is already designated as a private object with another checkmark 604.

Figure 7:
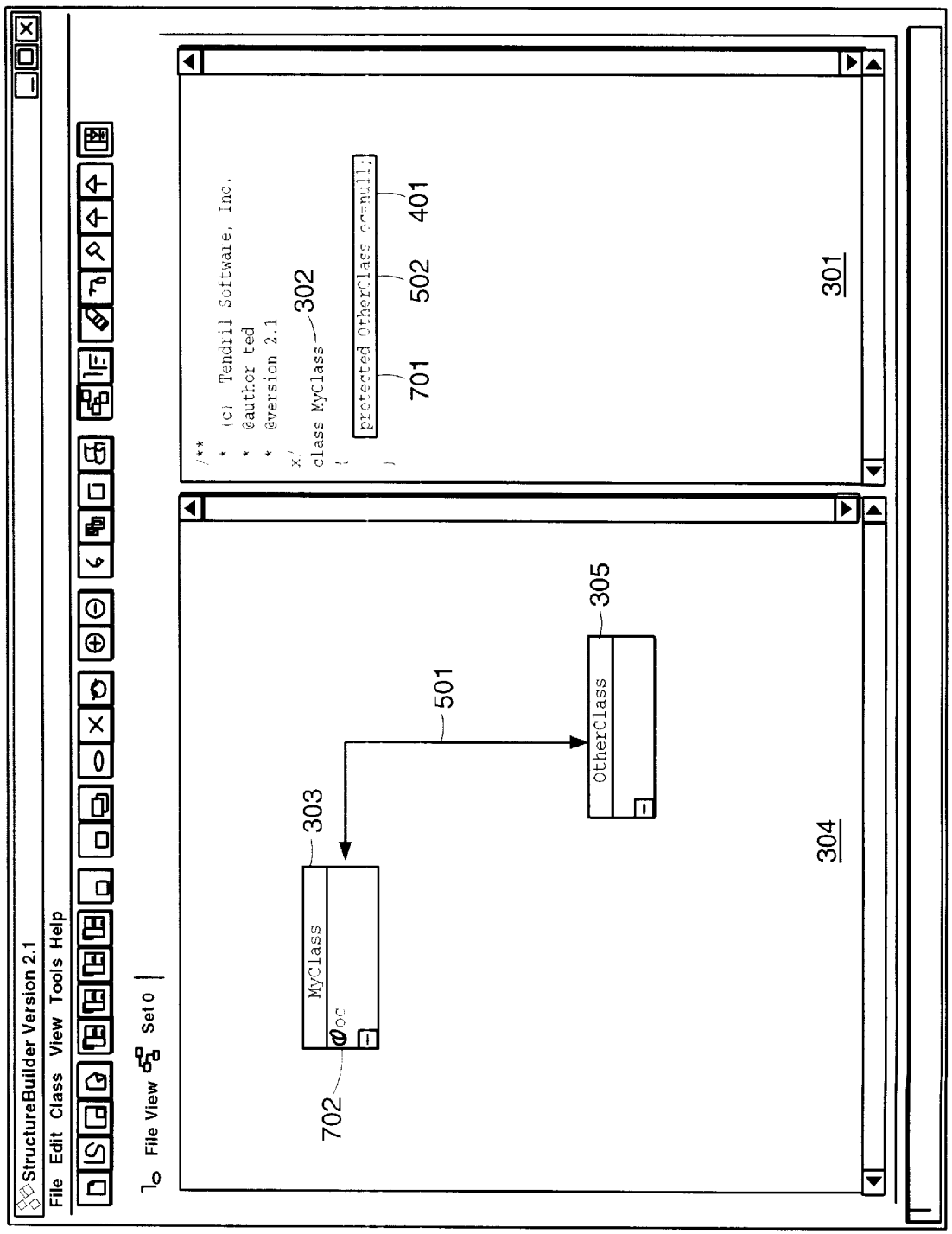

FIG. 7 shows the result in both windows of the change referred to in FIG. 6. This screen shot displays the update to variable oc 401. Variable oc 401 of class OtherClass is now designated as protected as represented by the word 'protected' 701 positioned directly in front of OtherClass on the right side of the screen shot within editor window 301. Additionally on the left side of the screen, in diagram window 304, oc 401 is updated with a symbol of a key 702 being place in front of it indicating that oc 401 is protected.

Figure 8:
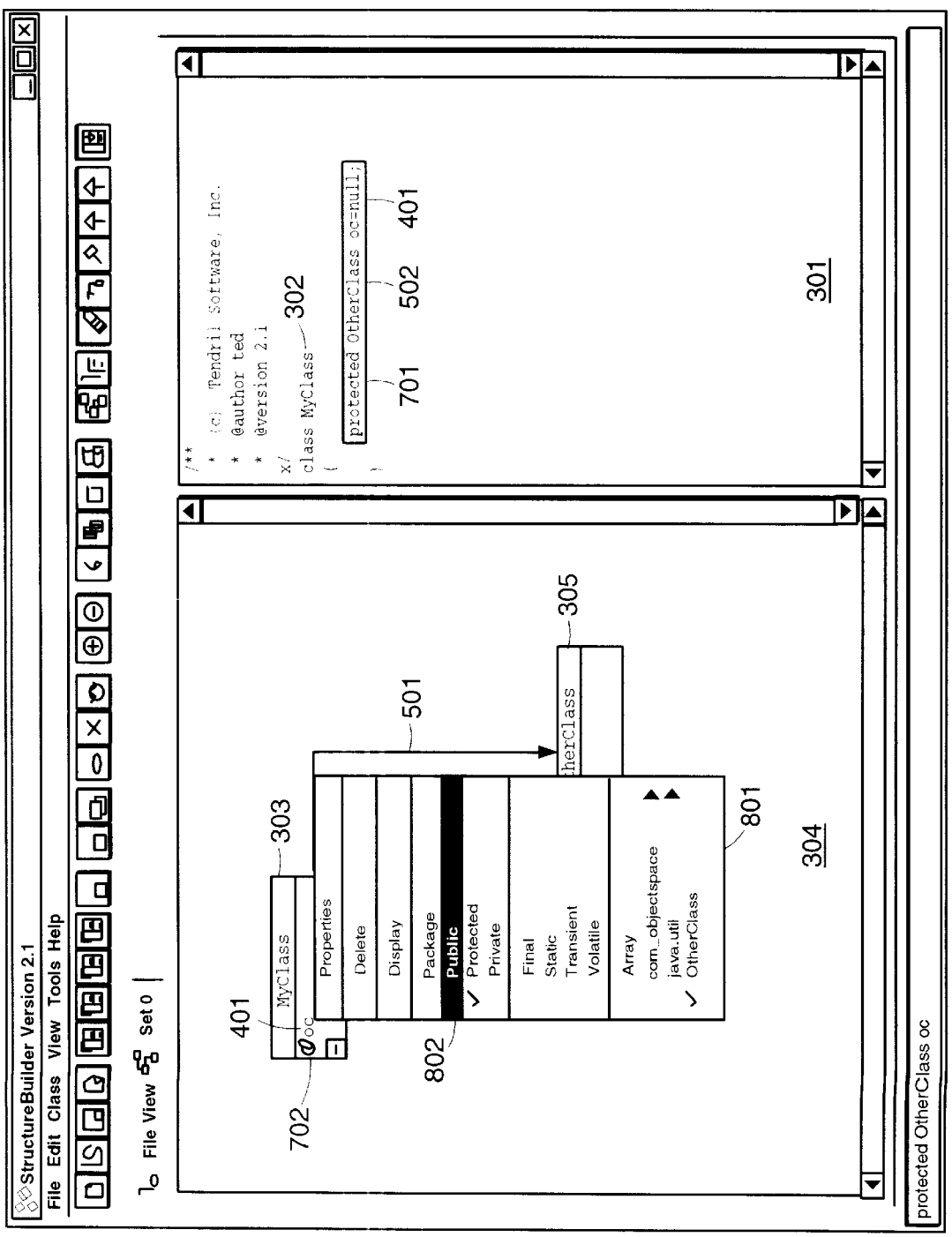

FIG. 8 shows selection of the same variable and context-sensitive menu 601 in diagram window 304 as shown in connection with FIG. 6, the menu evidencing a change to the variable from protected to public access. Here the user is attempting to modify the diagram in diagram window 304 and graphical user interface 205 interacts with codeblock generator 204, bypassing lexical analyzer 201 and parser 202, since source code 11 is not being edited. By positioning the cursor over variable oc 401 and clicking on the variable, the user causes a context sensitive menu to be displayed 801. Context sensitive menu 801 allows for the user to select a change to be made to codeblock 13 of variable oc 401. In this example, user selects public by highlighting public 802 to change codeblock 13 from protected to public.

Figure 9:
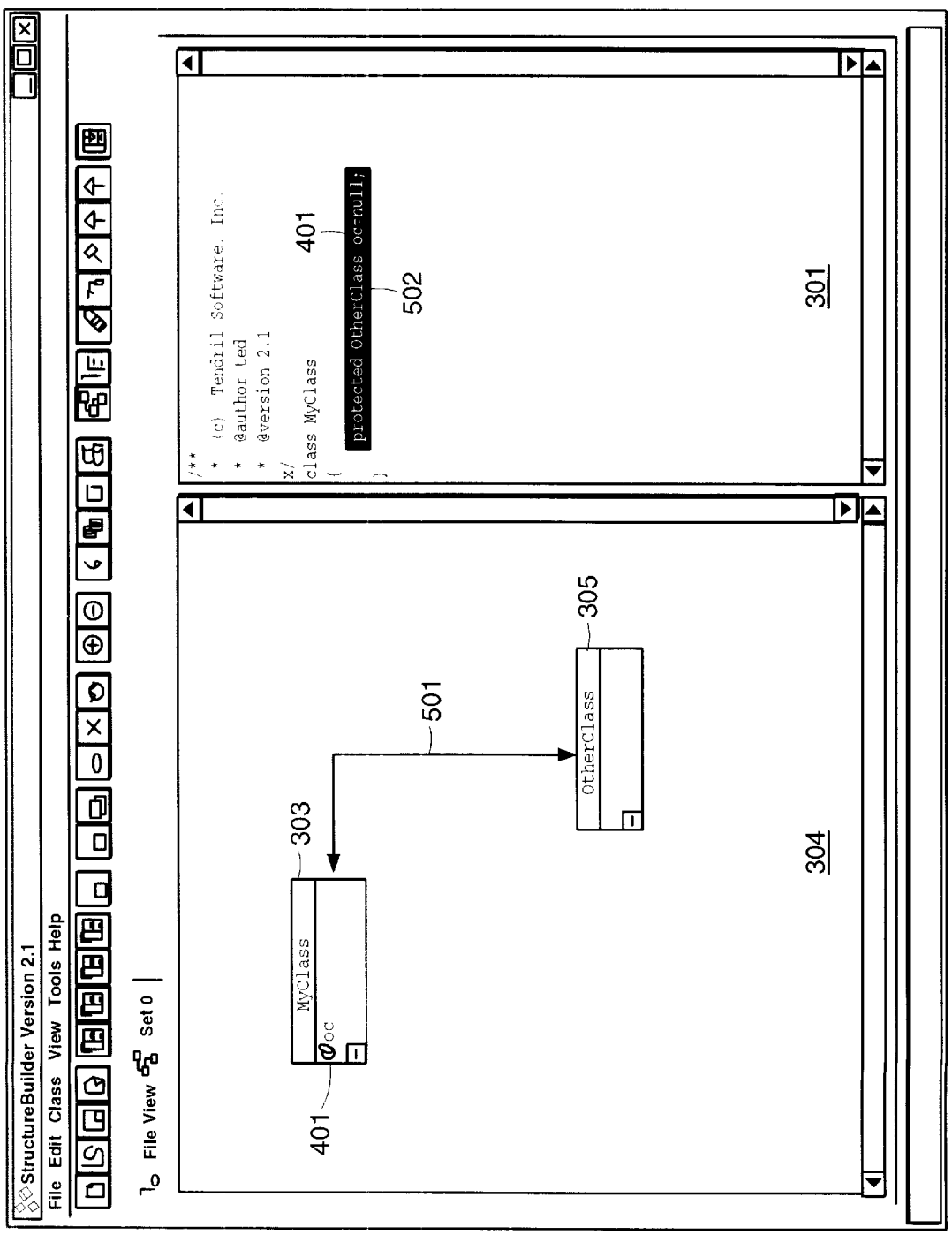

FIG. 9 shows the result in both windows of the change referred to in FIG. 8. oc 401 is now a public variable as indicated inhighlighted codeblock 502 of editor window 301. In diagram window 304 the key has been removed from the space in front of oc 401 indicating that the variable is public.

Figure 10:
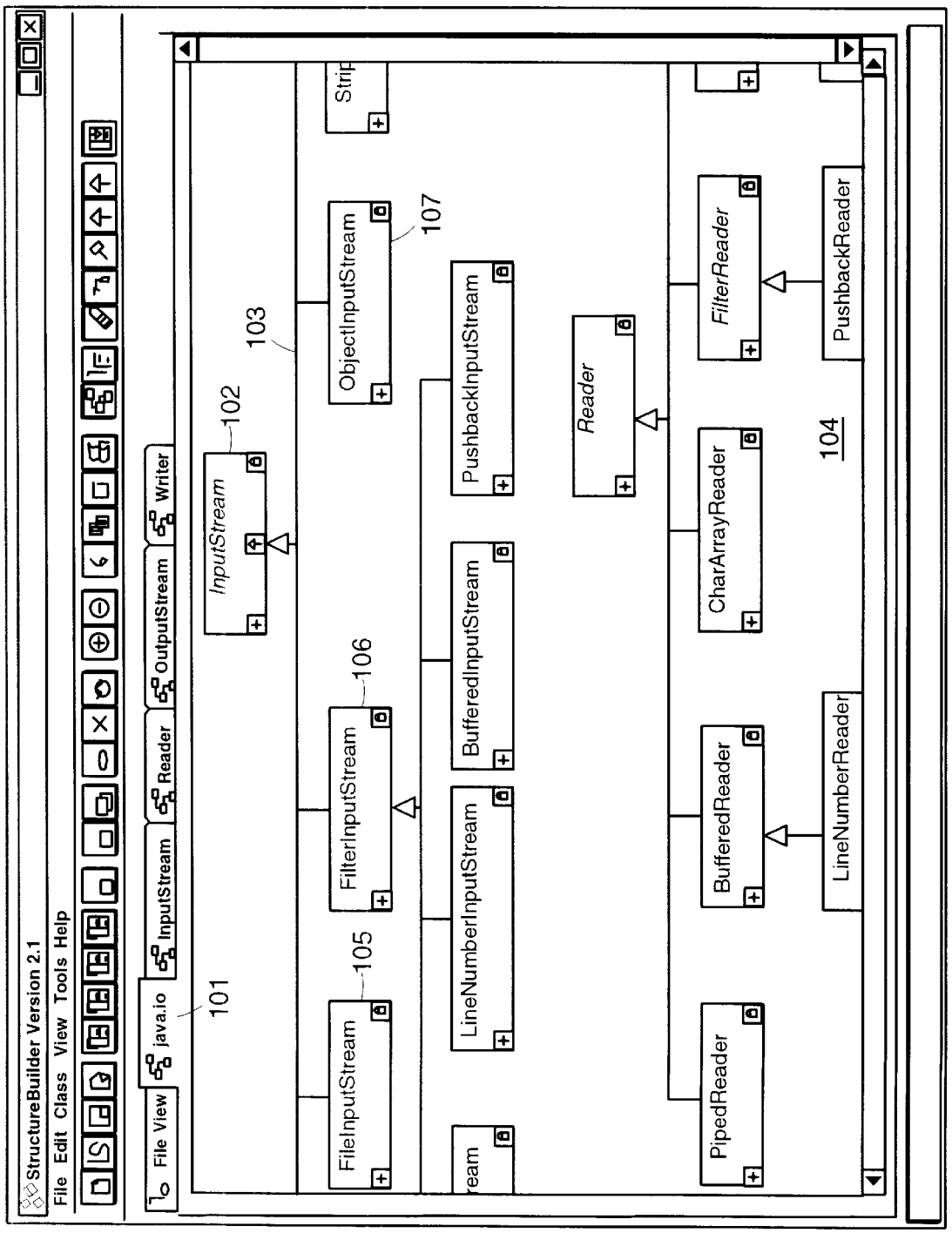
FIG. 10 shows tabs for displaying a selected one of multiple views defined by a view definer in accordance with a preferred embodiment of the invention, wherein the java.io tab has been selected and the InputStream class is shown collapsed with only inheritance lines showing.

FIG. 10 shows tabs for displaying a selected one of multiple views defined by a view definer in accordance with a preferred embodiment of the invention, wherein java.io tab 101 has been selected and InputStream class 102 is shown collapsed with only inheritance lines 103 showing. Inheritance lines 103 indicate that a class derives from some other class, known as the parent class inheriting all of the functions, methods and variables of the parent class. In an embodiment, a user may create a tab view 104 of object model 12 by selecting objects within the model that are to be displayed. One or more classes in object model 12 may appear in a tab view 104. A user may then create other tab views which include the some or all of the same objects. The view definer will produce a graphic of the requested objects. In a preferred embodiment, each tab view 104 provides a unique view of a graphic representation of the object with different display characteristics of the same underlying object model 12. For example, a tab view graphic which contains the same class name as a second tab view graphic will have a pointer pointing to same object model 12 location as the second tab view graphic. Because there is only one underlying source for the different views, which is object model 12, data updated in one tab view 104 will also be updated in all views. Java.io tab 101 view that is displayed shows inheritance connections 103 between objects. For example, class InputStream 102, has connections to FileInputStream 105, FileInputStream 106, and ObjectInputStream 107.

Figure 11:
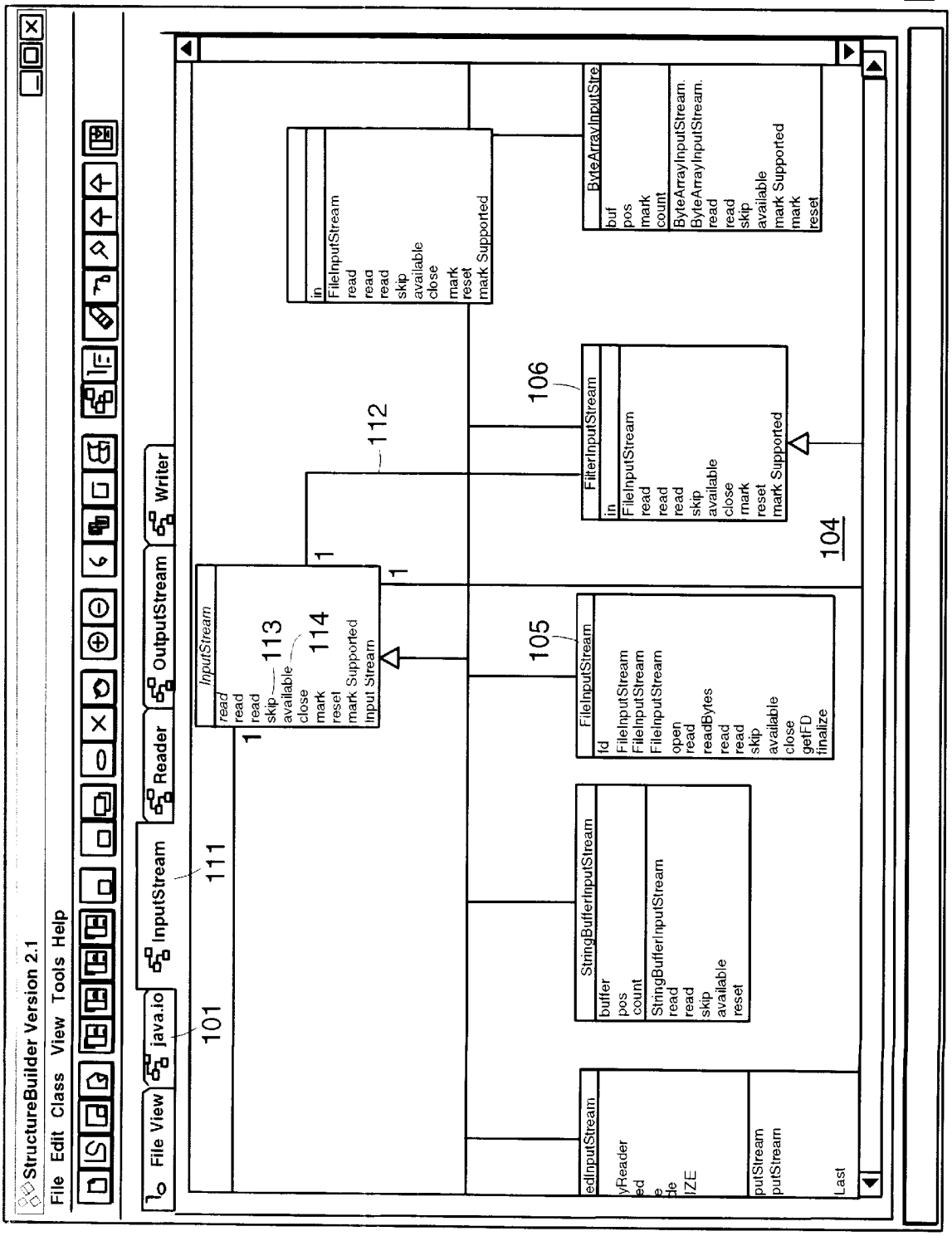
FIG. 11 is similar to FIG. 10, wherein the InputStream tab has been selected, and the same InputStream class is expanded and relationship lines are shown.

FIG. 11 is similar to FIG. 10, wherein InputStream tab 111 has been selected, and same InputStream class 102 is expanded and relationship lines 112 are shown. Relationship lines 112 indicate that within a class there exists a variable of the type of the other class from which the relationship line extends from. In this tab view, InputStream class 102 shows all of the available methods that are inside of class such as skip 113 and available 114.

Figure 12:
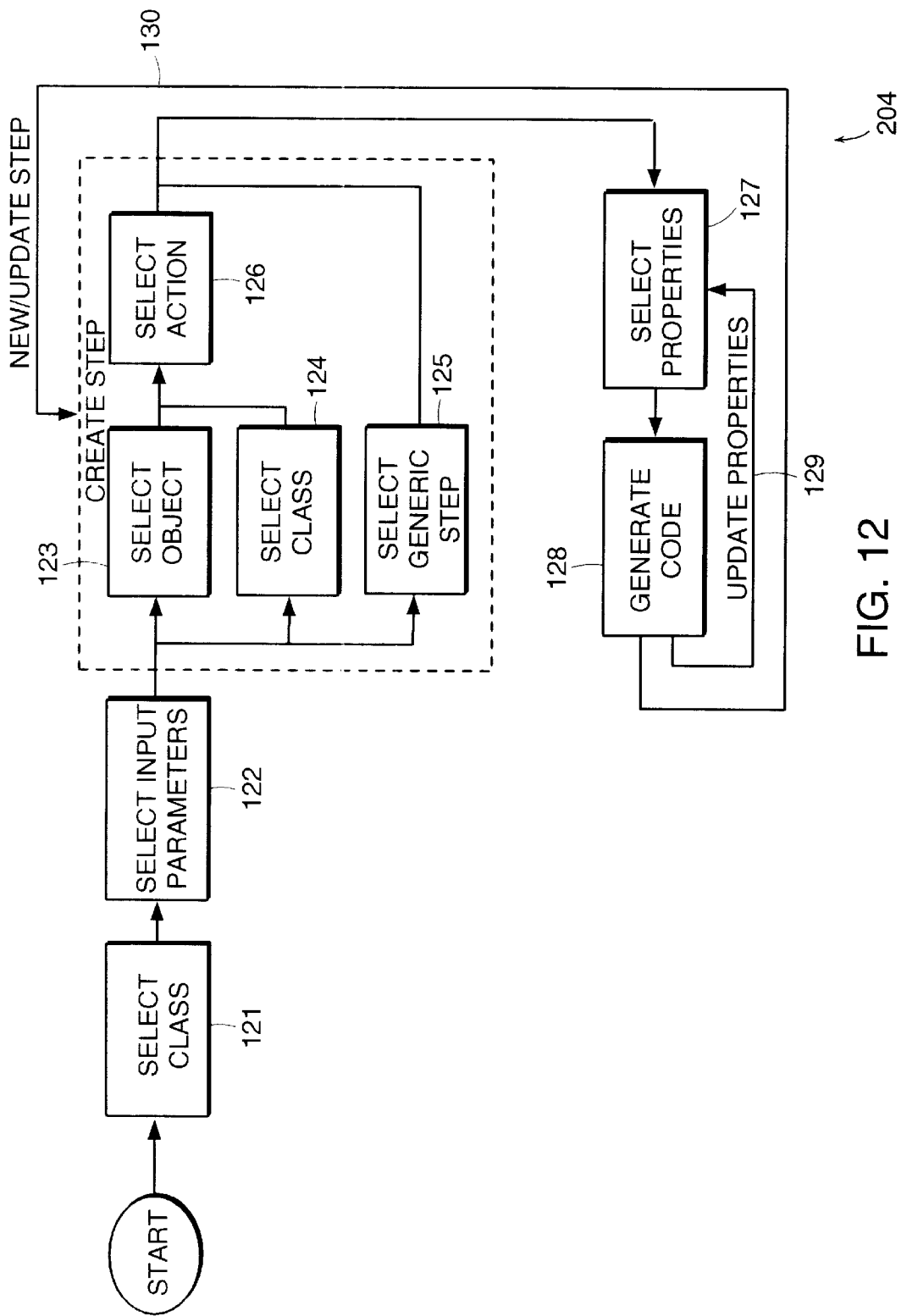
FIG. 12 is a logical flow diagram of a code generator in accordance with a preferred embodiment of the present invention.

FIG. 12 is a logical flow diagram of a code generator 204 in accordance with a preferred embodiment of the present invention. Code generator 204 produces code for a method within a specified class (not shown). This can lead to the generation of multiple methods within different classes depending on a user's decision.

User selects a class 121 which will contain the main method. The user then specifies input parameters 122 of the method. Each parameter has a name and a type associated with it. The user then selects a step to be associated with an instance of a class or an object 123 as it is referred to in object oriented programming, a class 124 or a generic action 125 not associated with a class or an instance of a class. The type of the class or the instance of the class determines the list of available actions 126 that will be displayed for the user. In an embodiment, in which the Java computer language is the chosen computer language for implementation, actions 126 which are associated with only a class include "Constructors" and "static Methods." Generic steps 125 not associated with either an object or a class are conditional actions such as "if" and "else."

An action 126 is uniquely determined by its name and the associated type. For instance, an instance of a class of type Vector might have the following actions associated with it: "add, remove, find and iterate." An instance of type Hashtable might also have a "find" associated with it. The system treats the "find" action associated with Vector to be different from the "find" actions associated with Hashtable. Each find will have its own set of properties for the action.

In the preferred embodiment once an action is selected properties 127 associated with the action must be chosen. Based on the user selection of these properties as represented by block 127, the system will generate code 128 and the system determines which objects are used by this action, as well as, the objects which are generated by these actions. The user can change the properties associated with each of the actions as shown by arrow 129. The user can also add new actions or delete old actions. As the user does so, the generated code changes as shown by arrow 130. Each method can therefore contain multiple actions. Variables generated by one action may become available to subsequent actions as designated by the user.

Figure 13:
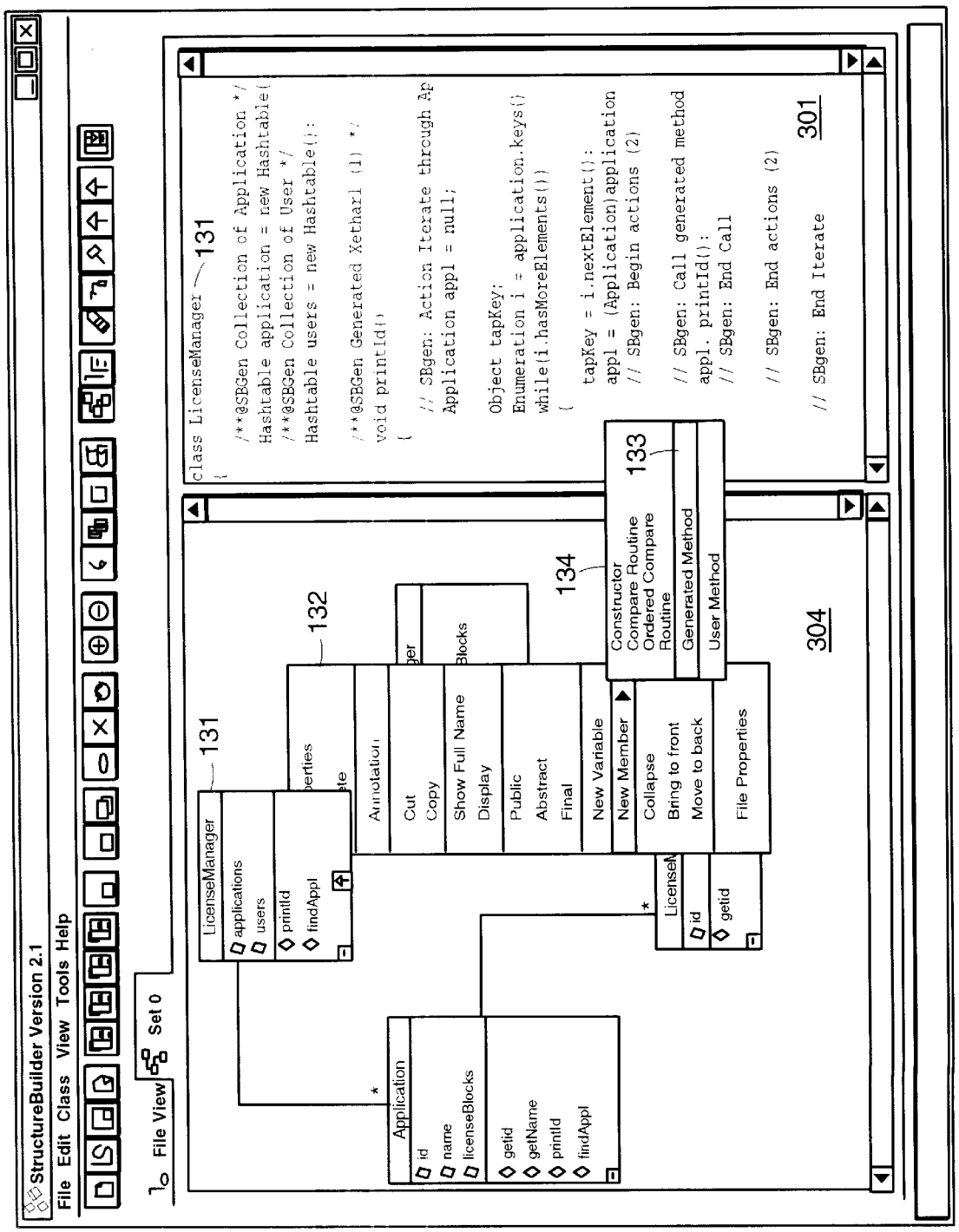
FIGS. 13 through 18 are screen shots showing operation of the code generator of FIG. 12.

FIGS. 13 through 18 are screen shots showing operation of the code generator of FIG. 12;

FIG. 13 shows in diagram window 304 user selection of a chosen class, namely LicenseManager 131, and a menu 132 presenting user choices for operation on the class, the selected operation being Generated Method 133, which invokes code generator 204 of FIG. 12. The user has selected to create a new method within LicenseManager class 131 in a menu 132 and selected to generate the method in a submenu 134. The system generates code using templates associated with each of the actions. These templates control the properties displayed and the options associated with them, the objects that are input to the action, the objects that are output from the actions, whether the action may have sub-actions, whether the action is iterative, and the actual code generated based on the properties of the action.

Figure 14:
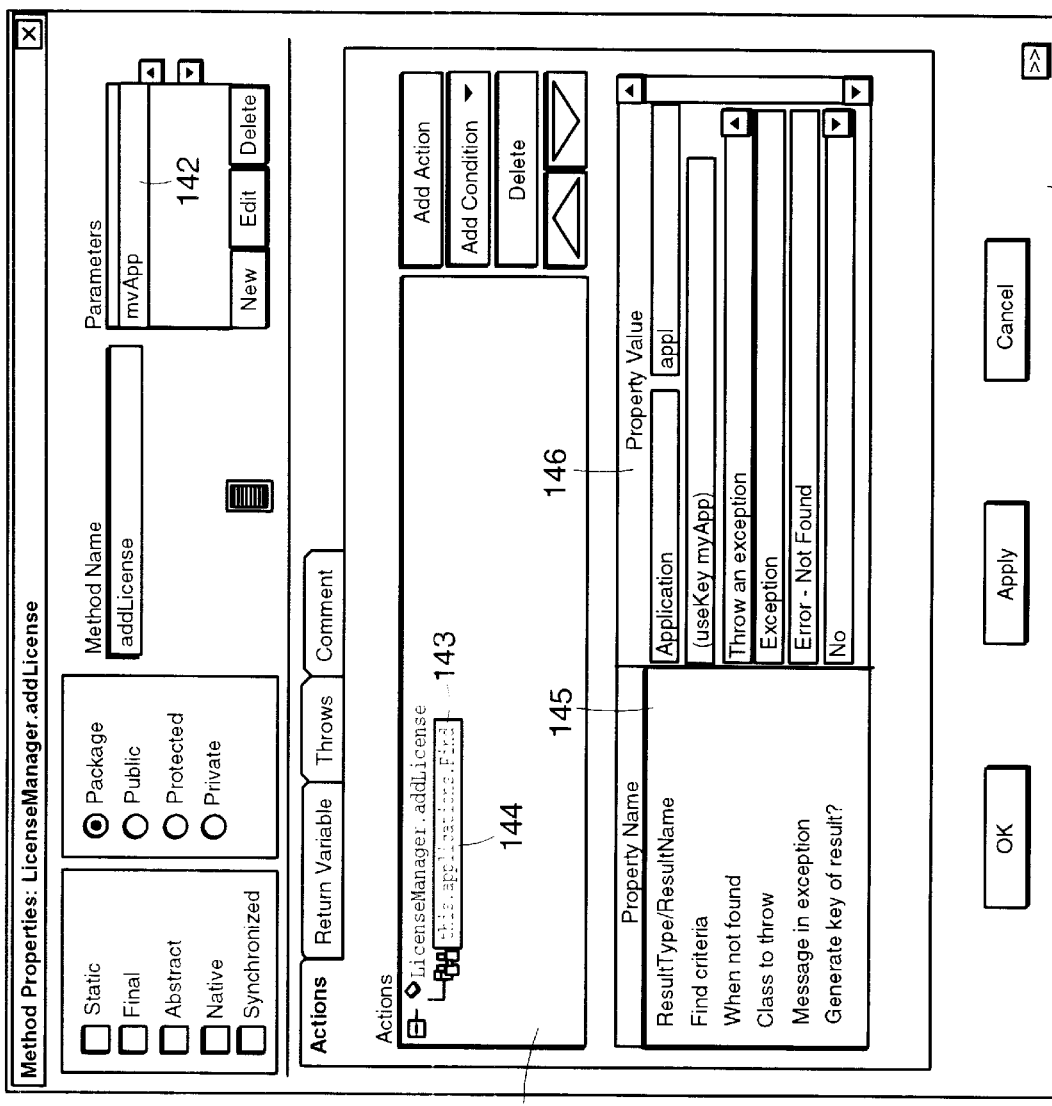

FIG. 14 shows a portion of an action selection interface, generated methods dialog screen 141, in accordance with a preferred embodiment of the invention here permitting selection of a parameter (myApp) 142, an action (Find) 143 in an action's window 147, and an entity on which action is performed (this.applications) 144 as well as displaying property names 145 and user selectable values 146 of such property names.

Figure 15:
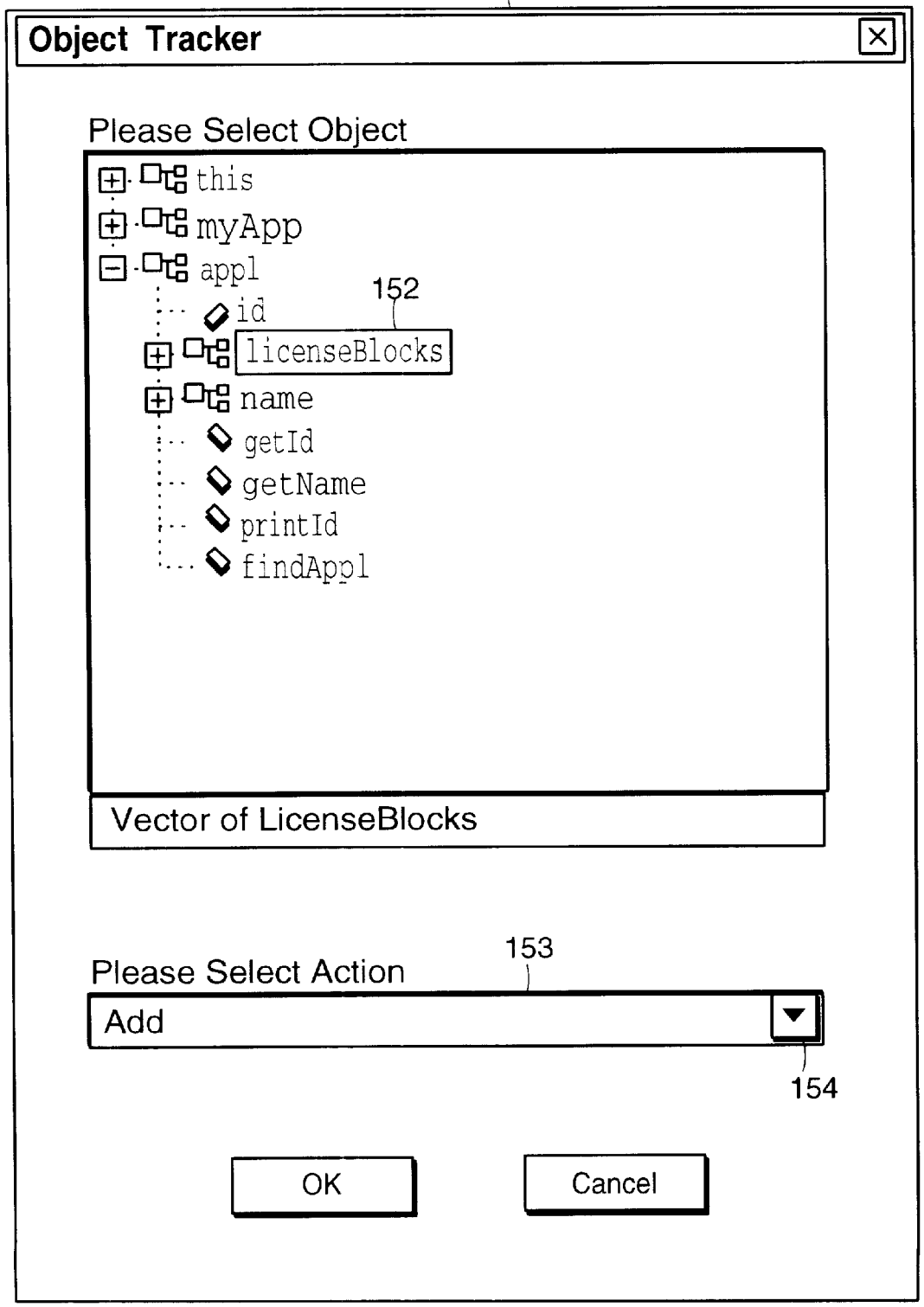

FIG. 15 shows another portion of action selection interface, Object Tracker 151, in which an object (here appl.licenseBlocks) 152 may be selected as well as an action (here Add) 153 to be performed on the object. Based on the object that is selected a context sensitive list of choices is presented to the user if the user selects downward pointing triangle 154.

Figure 16:
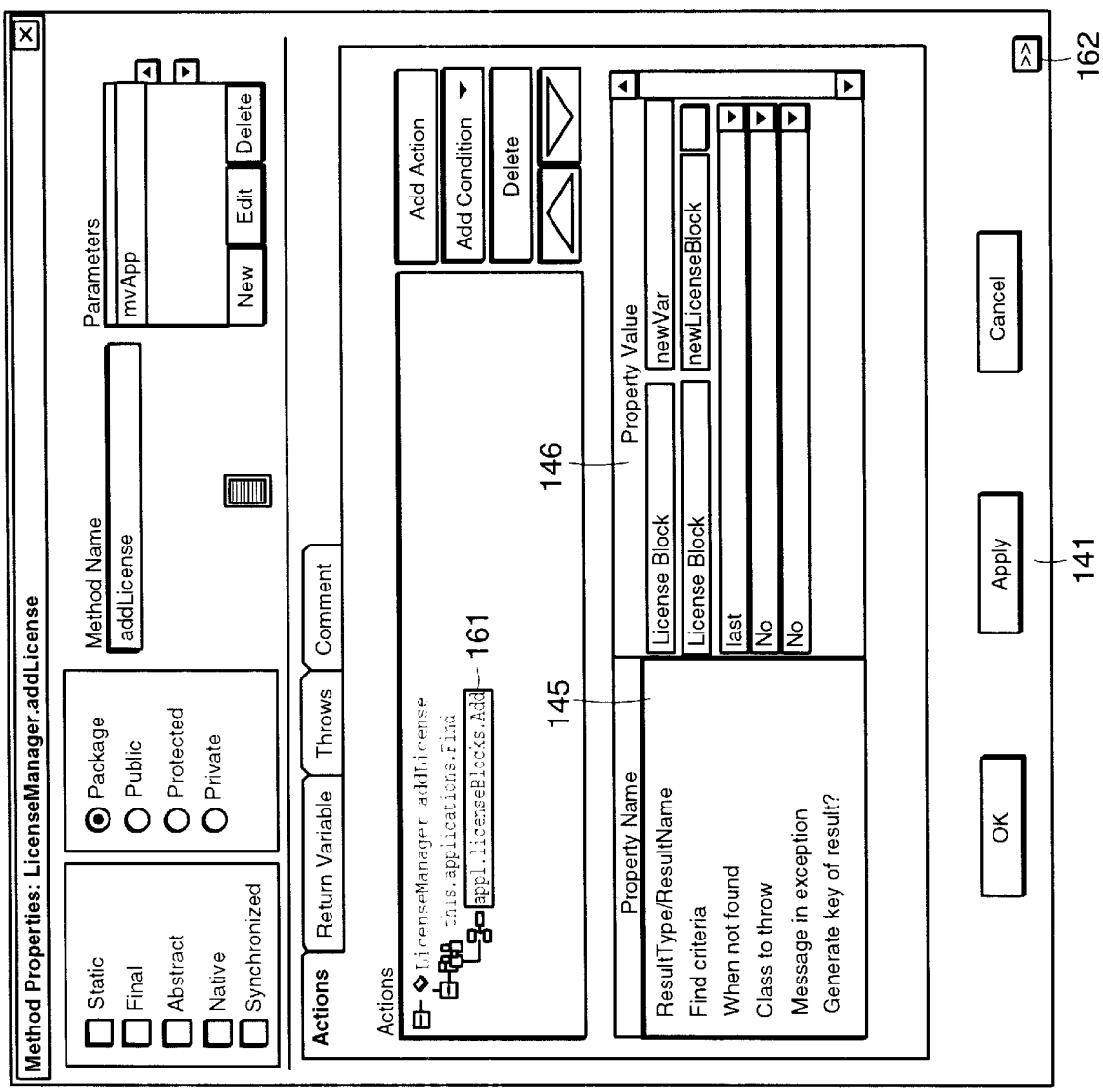

FIG. 16 shows, in generated methods dialog screen 141, the result of the selection of FIG. 15. The parameters list displays the input parameter for method, myApp 142. The actions menu highlights selected action Add 161. Property names 145 available and property values 146 are specific to action Add 161.

Figure 17:
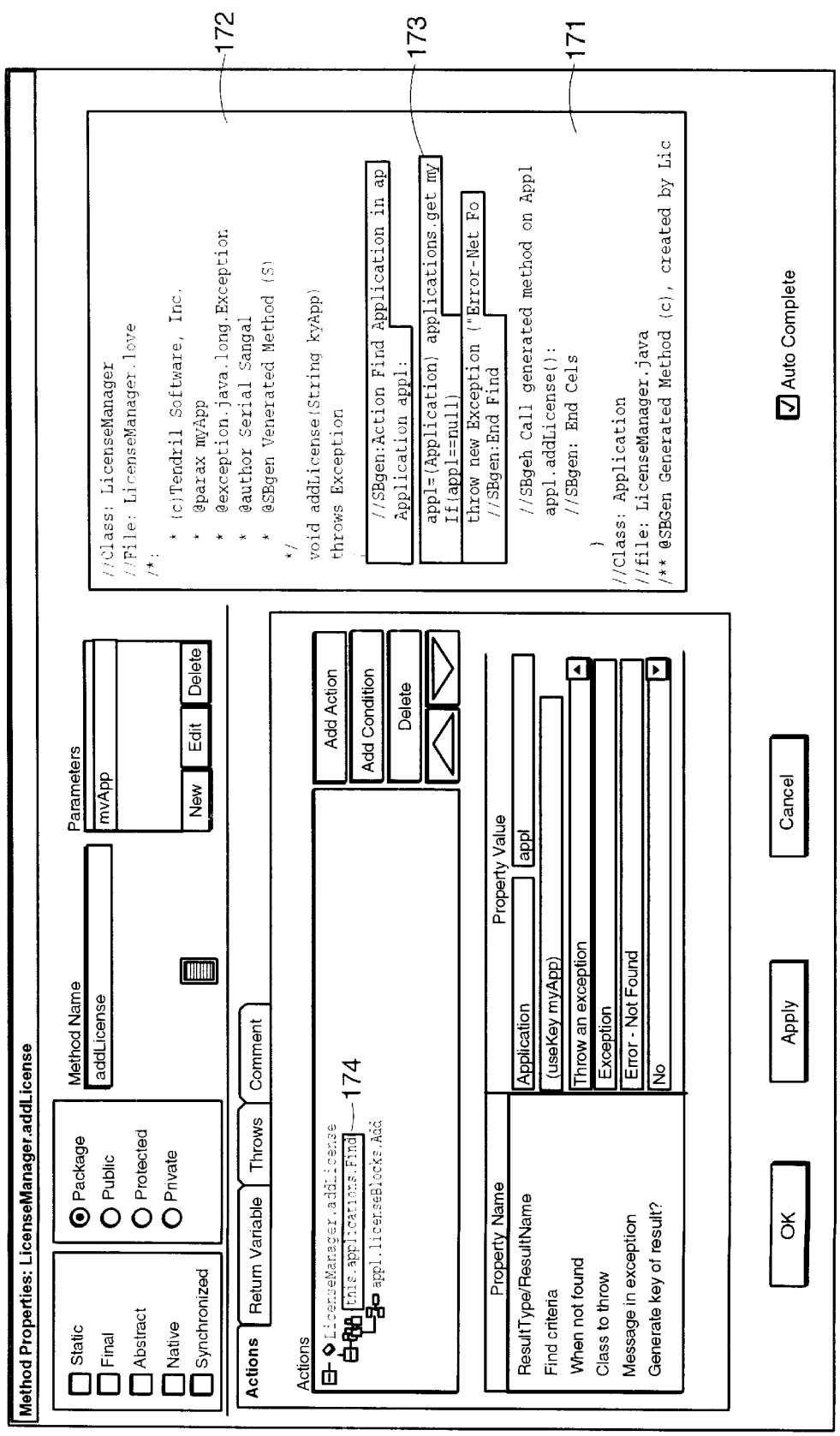
Figure 18:
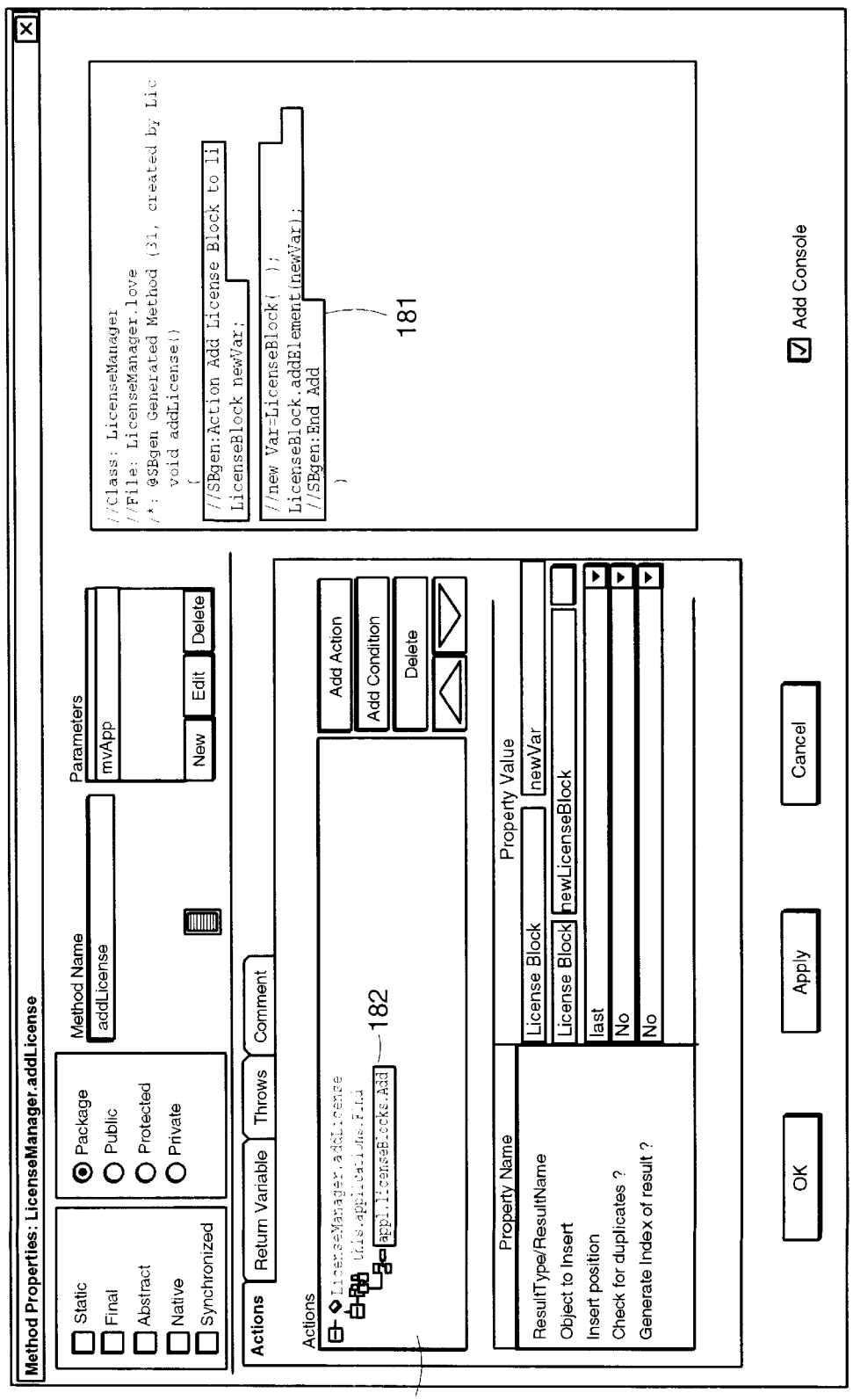

FIG. 17 shows the effect of selecting double arrow button 162 on the lower right hand corner of the screen of FIG. 16, namely the additional display in the right hand portion of screen of an editor window 171 showing source code 172 generated as a result of the operation of the action selection interface, wherein highlighted codeblock 173 corresponds to similarly highlighted object-action combination 174 in actions window 147; and FIG. 18 is similar to FIG. 17 wherein a different highlighted codeblock 181 corresponds to another highlighted object-action combination 182 in actions window 147.

FIG. 19 shows source code which is generated for the process of variable transportation. If an action in one method changes the value of an object and a subsequent action in another method uses that object, the variable must be transported in such a way that the subsequent action sees the correct value of the object.

Code generation will determine how the variables or objects are transported across the methods so that they are made accessible to the actions which are using the variables or objects. The system creates a set of methods for implementing the actions. Each method contains one or more of the actions. Based on the input and output parameters associated with each action, the system determines the input and output parameters for each method. It generates the appropriate code for calling the method, generates the header of the method, generates code for creating the wrappers, generates the code for extracting variables from wrappers. Also associated with each of the actions is a template. This template generates the code for performing the action based on the properties that may have been set by the user.

In an embodiment, each input parameter is further marked as being passed into the method as a regular parameter or it is marked as the "this" variable as defined in the Java programming language. Each output parameter is further marked as being passed back by method return or the output parameter is passed back through a wrapper class.

For example assume that there are three methods being generated called method1, 191, method2 192, and method3 193. Method1 calls method2 194. Method1 calls method3 195. Var0 and var1 are created prior to calling method2 which is not shown. Var0 and var1 are used in method2 192. The values for var2 and var3 are changed in method2. Var2 and var3 are used in method3. Var0 is passed as a "this" parameter of method2 and var1 is passed as an input parameter of method2. Var2 is passed back through method return 197. Var3 is passed back through a wrapper 196. Prior to calling method2 a wrapper is generated 198. After the call to method2, the var3 is extracted from wrapper 199.

Figure 20:
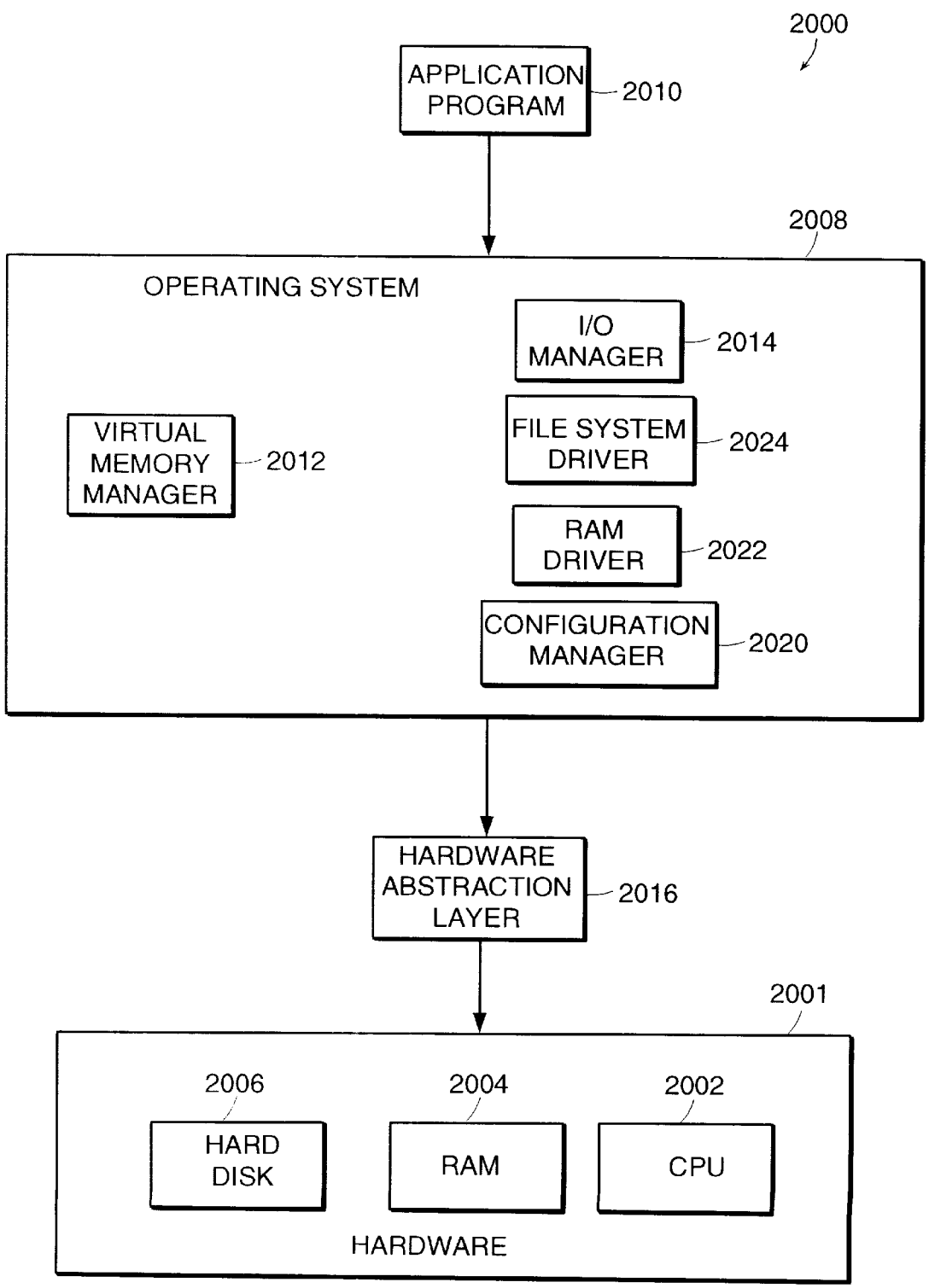
FIG. 20 illustrates the system architecture for an exemplary computer system 2000 on which the disclosed method and apparatus for an object oriented textual editor operative on a text source in a language having syntax properties can be implemented.

FIG. 20 illustrates the system architecture for an exemplary computer system 2000, such as an IBM THINKPAD 701® computer (distributed by International Business Machines of Armonk, N.Y.), on which the disclosed system for an object oriented textual editor operative on a text source in a language having syntax properties can be implemented. The exemplary computer system of FIG. 2000 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 20.

The system 2000 includes hardware 2001 comprising, among other things, a central processing unit 2002 for processing computer instructions, random access memory ("RAM 2004") for high-speed, volatile data storage, and a hard disk 2006 for non-volatile data storage. The system 2000 also includes a virtual memory operating system 2008 for both controlling system processes, and interfacing between an application program 2010 and hardware 2001. Operating system 2008 includes a virtual memory manager 2012 for accessing RAM 2004, and an input/output manager ("I/O manager 2014") for controlling input to and output from system 2000. RAM 2004 may be accessed by virtual memory manager 2012 only and thus, is not directly accessible by any other part of system 2000. In a preferred embodiment of the invention, operating system 2008 is the Microsoft Windows NT™ operating system, Version 4.0 ("Microsoft Windows NT™") distributed by Microsoft Corp. Although not necessary in many operating systems, a hardware abstraction layer 2016 ("HAL") also may be included in system 2000 to interface operating system 2008 with different hardware architectures. It should be noted that although the invention is described in connection with the Windows NT™ operating system, its principles apply to other virtual memory operation systems.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. An object oriented program editor operative on a text source in a language having syntax properties, the editor comprising:

a. a lexical analyzer for identifying language tokens in the text source;

b. a parser coupled to the lexical analyzer for associating syntax properties with the tokens;

c. a codeblock generator coupled to the parser, for grouping tokens with their syntax properties into a tree of codeblocks; and d. a graphical user interface for receiving and implementing user modifications of the codeblocks in a manner consistent with the programming language wherein the graphical user interface includes a graphical display of an object model, including object properties, for the text source and causes the graphical display of the object model to be automatically updated when a user modification is implemented to the text source.

2. An editor according to claim 1 wherein the graphical user interface enables user modification of the graphical display of the object model including modification of object properties and causes the text source to be correspondingly updated in a manner consistent with the graphical display of the object model and the programming language.

3. An editor according to claim 1, wherein the graphical user interface provides an arrangement for graphical selection of a codeblock and a menu showing syntactically correct options that are available for manipulation of the selected codeblock.

4. An editor according to claim 3, wherein the graphical user interface provides a menu showing all syntactically correct options that are available for manipulation of the selected codeblock.

5. An editor according to claim 3, wherein the codeblock is a variable.

6. An editor according to claim 3, wherein the codeblock is a method.

7. A system for generating source code in a program language with respect to an object model having a plurality of classes and relations among such classes, the system comprising:

a. a graphical class selection interface for user selection of a chosen class from a graphical representation of the object model;

b. an action selection interface for user selection of (i) an entity associated with the model, the entity being one of the chosen class or an instance of the chosen class, on which to perform an action and (ii) an action to be performed on the entity wherein the action to be performed is selectable from a set of possible actions, the set being determined by the entity selected; and c. a source code generator for generating source code in the program language to cause the action to be performed on the entity, and associating such code with the chosen class.

8. A system according to claim 7, wherein the entity is a class.

9. A system according to claim 7, wherein the entity is an instance of a class, such instance being an object.

10. A system according to claim 9, wherein (i) the object has a point in the source code where its value is updated by an action and (ii) the object has a point in the source code where its value is used by an action, further comprising:

a. an object transporter for the declaration of the object and for creating method parameters in the source code sufficient to pass the object from its declaration point to its usage points.

11. A system according to claim 10, wherein the object transporter identifies all usage points in the source code generated by the source code generator wherein the object is used and creates method parameters in the source code sufficient to pass the object to all such usage points.

12. A system according to claim 7, further comprising a parameter selection interface for user selection of input parameters, wherein the action selection interface provides a list of input parameters from which the entity may be selected.

13. A system according to claim 7, wherein the entity is an instance of a class generated in a previous operation of the action selection interface.

14. A system according to claim 7, wherein the action selection interface and the source code generator are configured to permit selection of a plurality of actions and a plurality of entities.

15. A system according to claim 7, the system further comprising a graphical user interface that enables user selection of the chosen class and the action.

16. A system according to claim 15, wherein the action selection interface includes an action properties interface for specifying properties of the action selected, wherein choices presented by the properties interface are customized according to the action selected.

17. A system according to claim 7, wherein the source code is generated in such a way as to take into account restrictions inherent in the object model.

18. A system according to claim 17, wherein the action selection interface includes an action properties interface for specifying properties of the action selected, wherein choices presented by the properties interface are customized according to the action selected.

19. A system according to claim 7, wherein the action selection interface includes an action properties interface for specifying properties of the action selected, wherein choices presented by the properties interface are customized according to the action selected.

20. A system according to claim 7, wherein the action selection interface further permits user selection of (iii) a condition for performance of a set of actions selected by the action selection interface, the set including at least one action.

21. A system according to claim 20, wherein the action selection interface includes an action properties interface for specifying properties of the action selected, wherein choices presented by the properties interface are customized according to the action selected.

22. A system for displaying an object model that is the subject of a computer program, the object model having a plurality of classes and relations among such classes, the system comprising:
   a. a common object model storage arrangement for storing the object model;
   b. a view definer, coupled to the common object model storage arrangement, for allowing a user to define a plurality of views of the object model, each view having its own display properties and set of classes and links between classes displayed therein;
   c. so that when the object model stored in the common object model storage arrangement is modified, all views defined by the view definer are correspondingly modified.

23. A system according to claim 22, wherein the view definer includes a graphical user interface for at least one of moving and copying a set of classes, the set having at least one member, from one of the views to another of the views.

24. A system according to claim 22, wherein the view definer permits each class to have distinct display properties in each view.

25. An object oriented program editor operative on a text source in a language having syntax properties, the editor comprising:
   a. a lexical analyzer for identifying language tokens in the text source;
   b. a parser coupled to the lexical analyzer for associating syntax properties with the tokens;
   c. a codeblock generator coupled to the parser, for grouping tokens with their syntax properties into a tree of codeblocks; and
   d. a graphical user interface for receiving and implementing user modifications of the codeblocks in a manner consistent with the programming language wherein the graphical user interface enables user modification of the object model including modification of object properties and causes the text source to be correspondingly updated in a manner consistent with the graphical display of the object model and the programming language.

* * * * *